Figure 1:
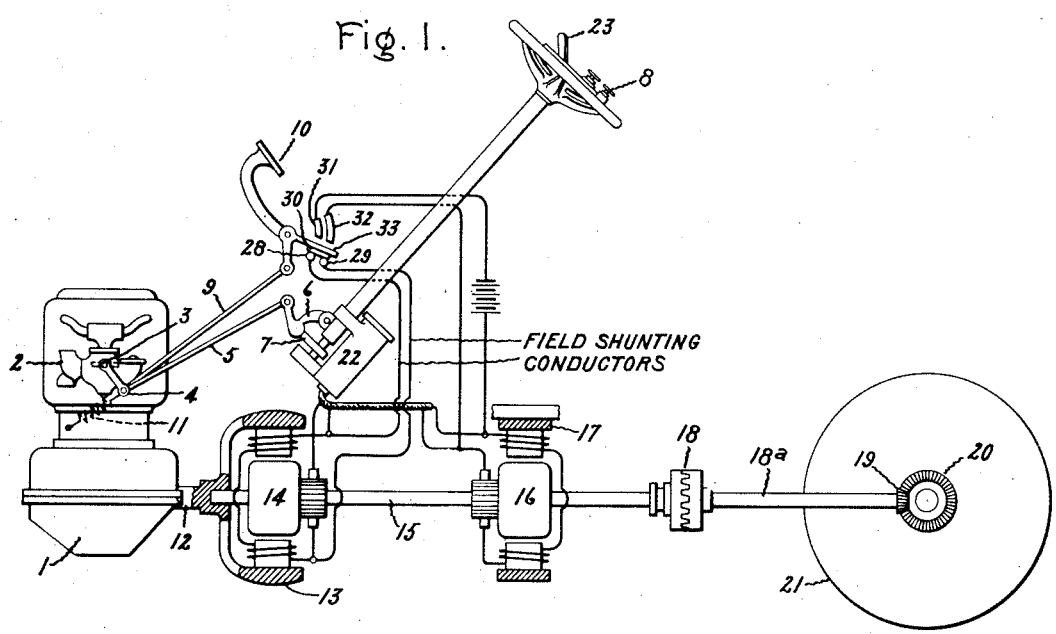

W. B. POTTER.
CONTROLLING MECHANISM FOR POWER GENERATING SYSTEMS.
APPLICATION FILED MAY 17, 1916.

1,280,833.

Patented Oct. 8, 1918.

FIELD SHUNTING CONDUCTORS

Inventor:
William B. Potter,
by Albert G. Davis
His Attorney.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

CONTROLLING MECHANISM FOR POWER-GENERATING SYSTEMS.

1,280,833.  Specification of Letters Patent.  Patented Oct. 8, 1918.

Application filed May 17, 1916. Serial No. 98,054.

*To all whom it may concern:*

Be it known that I, WILLIAM B. POTTER, a citizen of the United States, residing at Schenectady, county of Schenectady, State of New York, have invented certain new and useful Improvements in Controlling Mechanism for Power-Generating Systems, of which the following is a specification.

The present invention is directed to power generating systems wherein a variable speed prime mover, usually an engine of the internal combusion type, is employed to drive one member of an electric generator, the other member being normally connected to the power absorbing means, such as the road wheels of a vehicle for example. Mechanically connected to the second mentioned member of the generator is the rotor of an electric motor, the stationary member of which is carried by a suitable support, as by the chassis for example. Current generated by the first machine is supplied to the second for the purpose of increasing the torque delivered to the load or power absorbing means, as in starting or traveling on a grade for example. When the torque requirement is decreased to a predetermined value the circuit connections of the generator and motor are changed by a suitable controller and thereafter the driving effort takes place by reason of the magnetic drag exerted by the engine driven generator member on the member coöperating therewith, and mechanically connected to the load or power absorbing means. Under such conditions the motor is converted into a constant current generator for supplying current to a storage battery employed for starting the engine and for lighting purposes.

Considering the application of such a system to the propulsion of a vehicle as an example, but not as a limitation of my invention, the operation, particularly in crowded streets or where frequent starts and stops have to be made, and assuming the engine to be in continuous operation, is as follows: As the point is approached where the stop is to be made, or the vehicle reduced to a very low speed, the operator moves the handle of the controller of the electrical circuits from its then operating position to an open circuit position which opens the generator circuit and disconnects the battery from the motor so the battery will not discharge current to it, and at the same time reduces the speed of the engine to an idling speed by decreasing the supply of fuel thereto. This latter may be done by the accelerator pedal or by the throttle lever on the steering column. To restart the vehicle the supply of fuel to the engine is increased and the controller lever moved to a position to close the electrical circuits. Stated in other words, the operator has to perform two entirely distinct operations, one of which is commonly done by hand, and the other by foot, the two taking place more or less together, depending upon the skill of the operator in this particular.

The object of my invention is to obviate this double operation, both in starting and in stopping, and to provide an improved arrangement wherein when the regulator for the engine is moved to reduce the engine speed to predetermined value the transmission system is automatically rendered inoperative and the battery disconnected from the motor.

For a consideration of what I believe to be novel and my invention, attention is directed to the accompanying description and the claims appended thereto.

In the drawing, Figure 1 illustrates diagrammatically a part of an automobile vehicle equipped with my improved apparatus, and Figs. 2 to 5 are circuit diagrams.

1 indicates a multi-cylinder internal combustion engine of any suitable type which is capable of a wide change in running speed. On the side is a carbureter 2 containing the usual throttle valve or regulator mounted on the spindle 3. On the latter is mounted an arm 4 which is connected by a rod 5 with a lever 6. The lever is actuated in a manner to change the position of the throttle valve by a cam 7 of variable radius, which in turn is rotated by a hand lever 8 on the steering column. The arm 4 is also connected by a rod 9 with a pedal or lever 10 which is actuated by the foot of the operator and is usually referred to as the accelerator. The arrangement of the two controlling means is such that the position of the hand lever 8 determines the position to which the throttle will return under the action of the spring 11 when the accelerator pedal is released. The hand throttle lever can be adjusted without reference to the pedal. This type of control is in common use and is worked out in a variety of ways.

On the main shaft 12 of the engine is mounted one member of an electric generator, in this case the field magnet 13 of a direct current series wound machine. The other member or armature 14 is mounted on a shaft 15 that is revolved independently of the field magnet and at a somewhat lower speed. Due to this difference of speed or slip current is generated which, for heavy torque transmission of power to the vehicle wheels and low speed of the latter, is transmitted to the motor. For high speed and decreased torque the generator is short circuited on itself and the slip will then be sufficient to generate enough current to cause the armature to be dragged around by the rotating field. On the shaft 15 is the armature 16 of an electric motor whose field magnet 17 is stationary. This motor is also of the series wound type. The shaft 15 is connected by a releasable jaw clutch 18 with the propeller shaft 18ª, the latter having the usual pinion 19 meshing with the bevel gear 20 in the differential to which the road wheels 21 are connected.

The circuits of the two electrical machines are controlled by a controller 22 of any approved type mounted in such manner as to be moved by the hand lever 23 on the steering column. The character of the control of these machines can be anything that is suitable or desirable.

In Figs. 2 to 5 inclusive are shown some of the circuit connections that are established by the controller and employed in a type of apparatus to which my invention is especially applicable.

Figure 2:
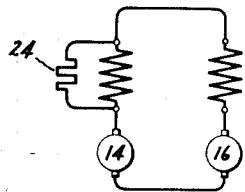
Figure 3:
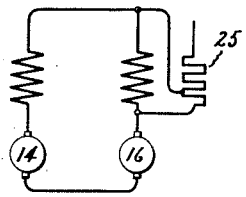
Figure 4:
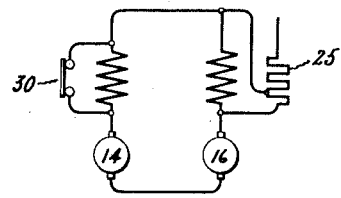
Figure 5:
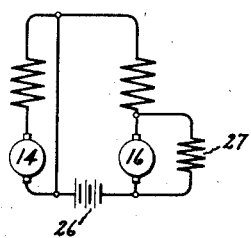

In Fig. 2 is illustrated the circuit connections for starting the vehicle. It will be observed that the field of the generator is shunted by a limited amount of resistance 24, thereby weakening it to a certain degree. Fig. 3 represents one of the high speed positions of the controller in which case the motor field is shunted by a relatively low resistance. Fig. 5 represents the high speed position of the controller wherein the generator is short circuited on itself and the motor is acting as a substantially constant current generator and charging the storage battery 26, there being an additional shunt field 27 cut into circuit which acts in opposition to the series field winding. The shunt field winding 27 has been omitted from Fig. 1 to simplify the illustration.

As before pointed out, it is undesirable in stopping to always move the controller lever from a high speed position when the circuit connections are, say those shown in Fig. 3, to an open circuit position, in addition to cutting down the supply of fuel to the engine. In such a case the controller lever would commonly be moved several notches. Now, since the fuel supply must be cut down to prevent the engine from racing when the load is removed, means are provided for simultaneously rendering the generator ineffective and reducing the fuel supply, and this by a single device, the controller in the meanwhile being left at its then operating position.

To accomplish this, a pair of contacts 28 and 29 are provided which are closed by a contact 30 mounted on the accelerator pedal 10 whenever pressure is removed from the latter, the release of the pedal also reducing the supply of fuel to the engine by moving the throttle valve. The contacts 28 and 29 are connected by suitable conductors around the field winding to form a low resistance shunt. This immediately kills the generator by shunting its field either completely or through a low resistance, and in addition to stopping the propulsive effect of the engine on the vehicle, it eliminates the danger of stalling the engine, which might happen under certain conditions. To restart, the operator merely depresses the foot pedal, which opens the short circuit, thus restoring the circuit connections to those previously established by the controller 22, and simultaneously more fuel is admitted to the engine. It is to be particularly noted that the shunt circuit above referred to is entirely independent of any circuit established by the controller 22 and only comes into service under certain specified conditions.

To avoid having the storage battery 26 supply current to the motor under these conditions and thus propel the vehicle, or other apparatus driven by the motor, while permitting said motor to act as a generator under conditions indicated in Fig. 5, a second set of switch contacts 31 and 32 are provided which are normally bridged by the contact 33 on the accelerator pedal when the vehicle is operating normally, but when the pedal is released, as is necessary to kill the field of the generator, opens the battery circuit and renders the battery and motor ineffective in so far as propulsive effort of the vehicle is concerned.

As previously stated, the cam 7, which is actuated by the throttle lever 8 on the steering column, forms a limit or stop for the return movement of the accelerator pedal when released by the operator. It, therefore, follows that if for any reason it be desired to prevent the field shunting connection from being closed the cam can be adjusted by said hand lever to such position that the bridging contact 33 cannot engage the contacts 28 and 29 when the pedal is released.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A power transmitting system comprising a variable speed engine, a regulator therefor, an electric generator having field magnet and armature members, one of which is driven by the engine and the other of which is connected to the load, an electric motor having one of its elements connected to the load and the other held stationary, a storage battery which is charged by the motor under certain operating conditions, circuit connections, and a controller for varying the circuit connections of the generator and motor, in combination with means automatically controlled in accordance with the position of said regulator for disconnecting the battery from the motor when said regulator moves to reduce the speed of the engine to a predetermined value.

2. A power transmitting system comprising a variable speed engine, a regulator therefor, an electric generator having field magnet and armature members, one of which is driven by the engine and the other of which is connected to the load, an electric motor having one of its elements connected to the load and the other held stationary, a storage battery which is charged by the motor under certain operating conditions, circuit connections and a controller for varying the circuit connections of the generator and motor, in combination with means automatically controlled in accordance with the position of said regulator for disconnecting the battery from the motor and rendering said power transmission system inoperative when said regulator moves to reduce the speed of the engine to a predetermined value.

3. A power transmitting system comprising a variable speed engine, a regulator therefor, an electric generator having field magnet and armature members, one of which is driven by the engine and the other of which is connected to the load, an electric motor having one of its elements connected to the load and the other held stationary, a storage battery which is charged by the motor under certain operating conditions, circuit connections, and a controller for varying the circuit connections of the generator and motor, in combination with contacts and connections independent of the controller and arranged to shunt the field magnet of the generator when said regulator is moved to reduce the speed of the engine to a predetermined value, and switching means for opening the circuit between the battery and the motor each time said shunt circuit is closed.

In witness whereof I have hereunto set my hand this 12th day of May, 1916.

WILLIAM B. POTTER.